Oct. 3, 1972   W. V. WILLIAMS   3,695,975
APPARATUS FOR RAPIDLY SPLICING A MULTITUDE OF
THERMOPLASTIC YARN ENDS
Filed Oct. 16, 1970   6 Sheets-Sheet 1
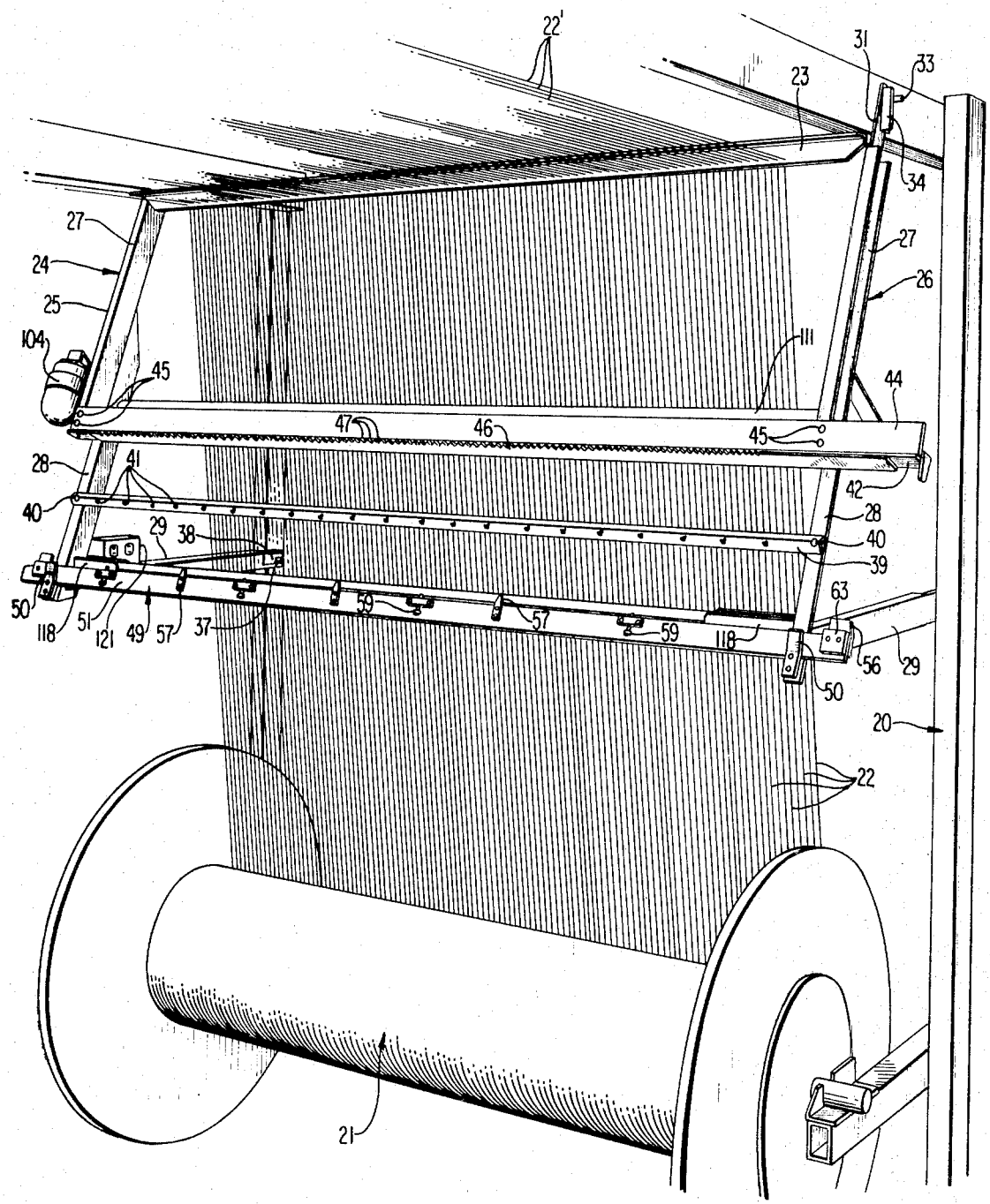
FIG. I
INVENTOR
WILLIE V. WILLIAMS
BY
ATTORNEY

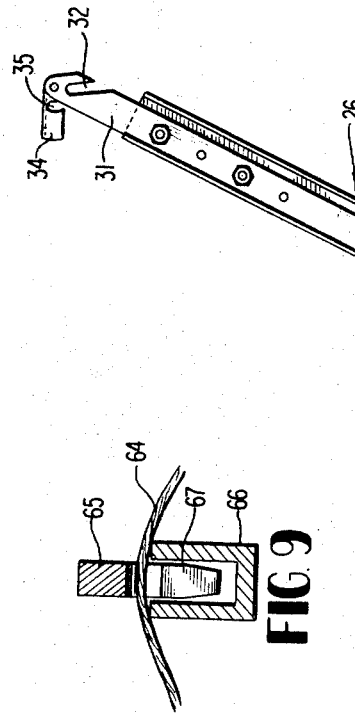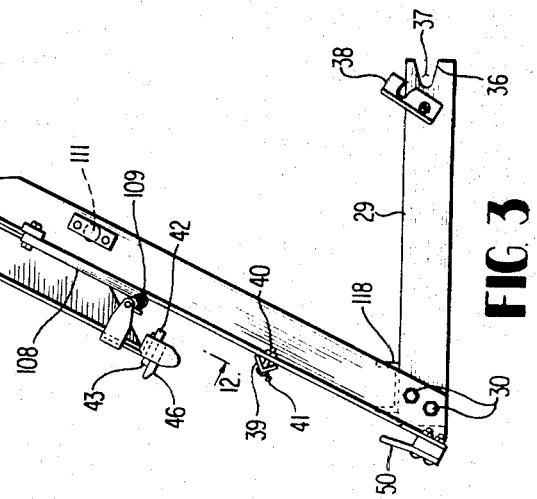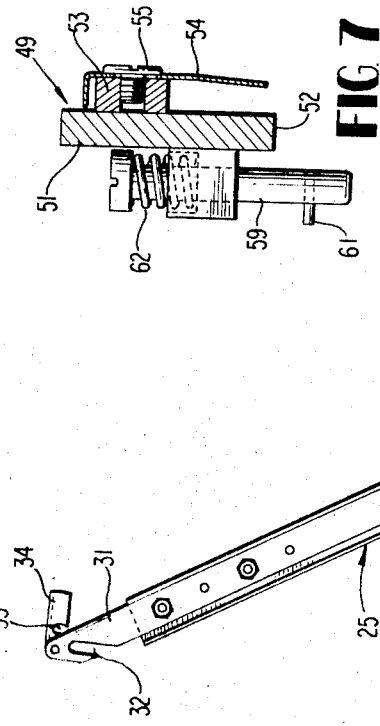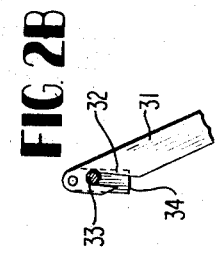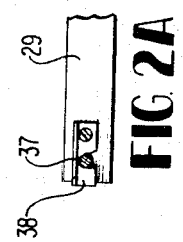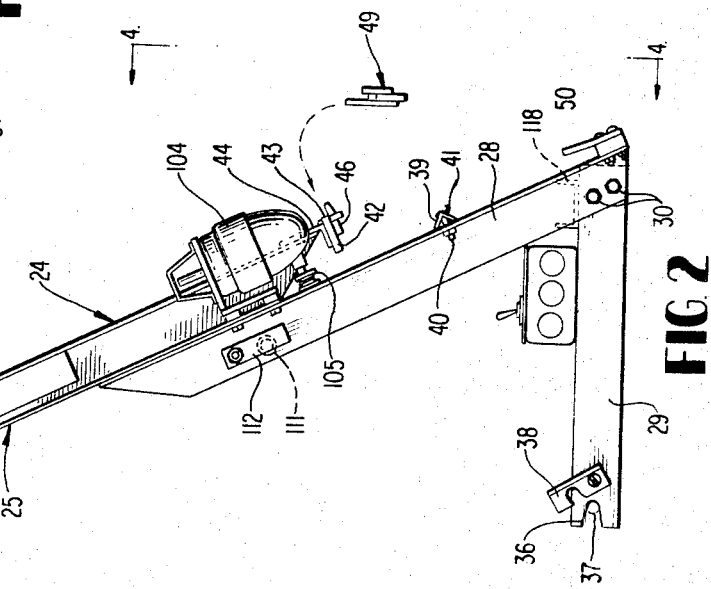

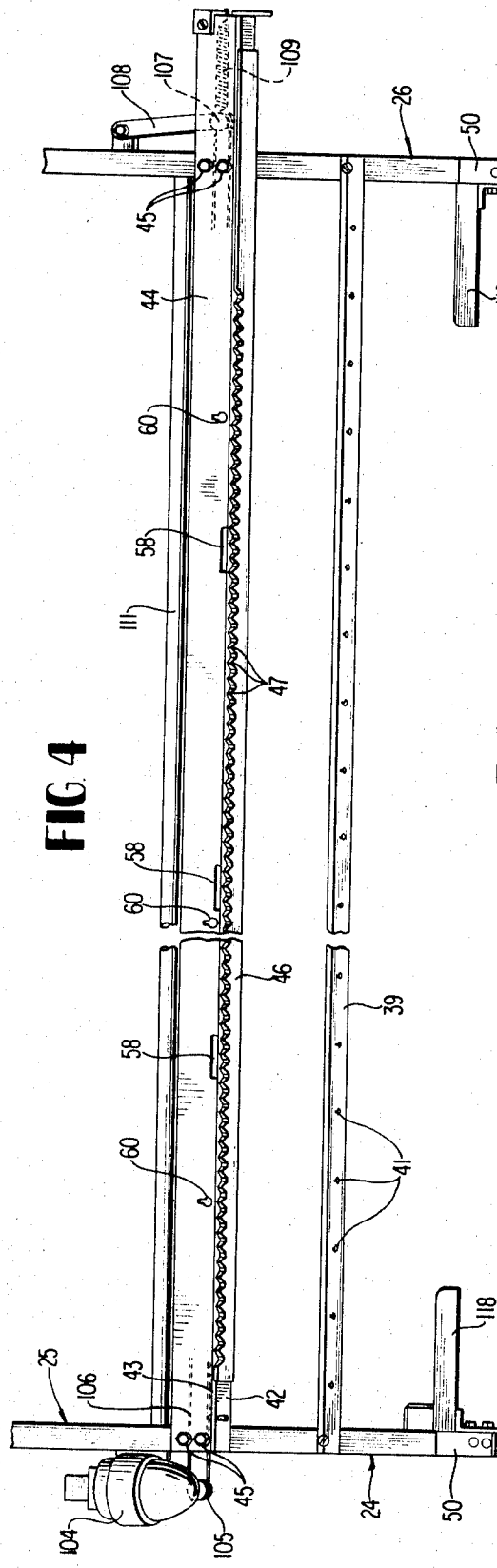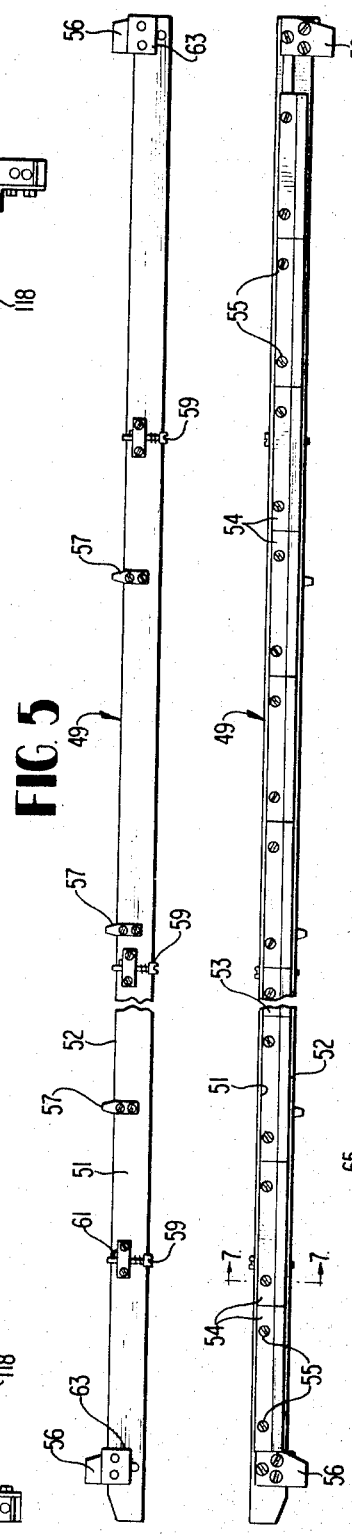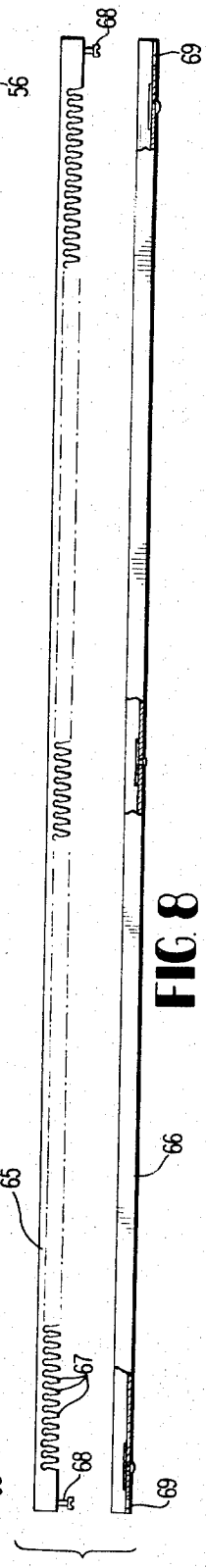

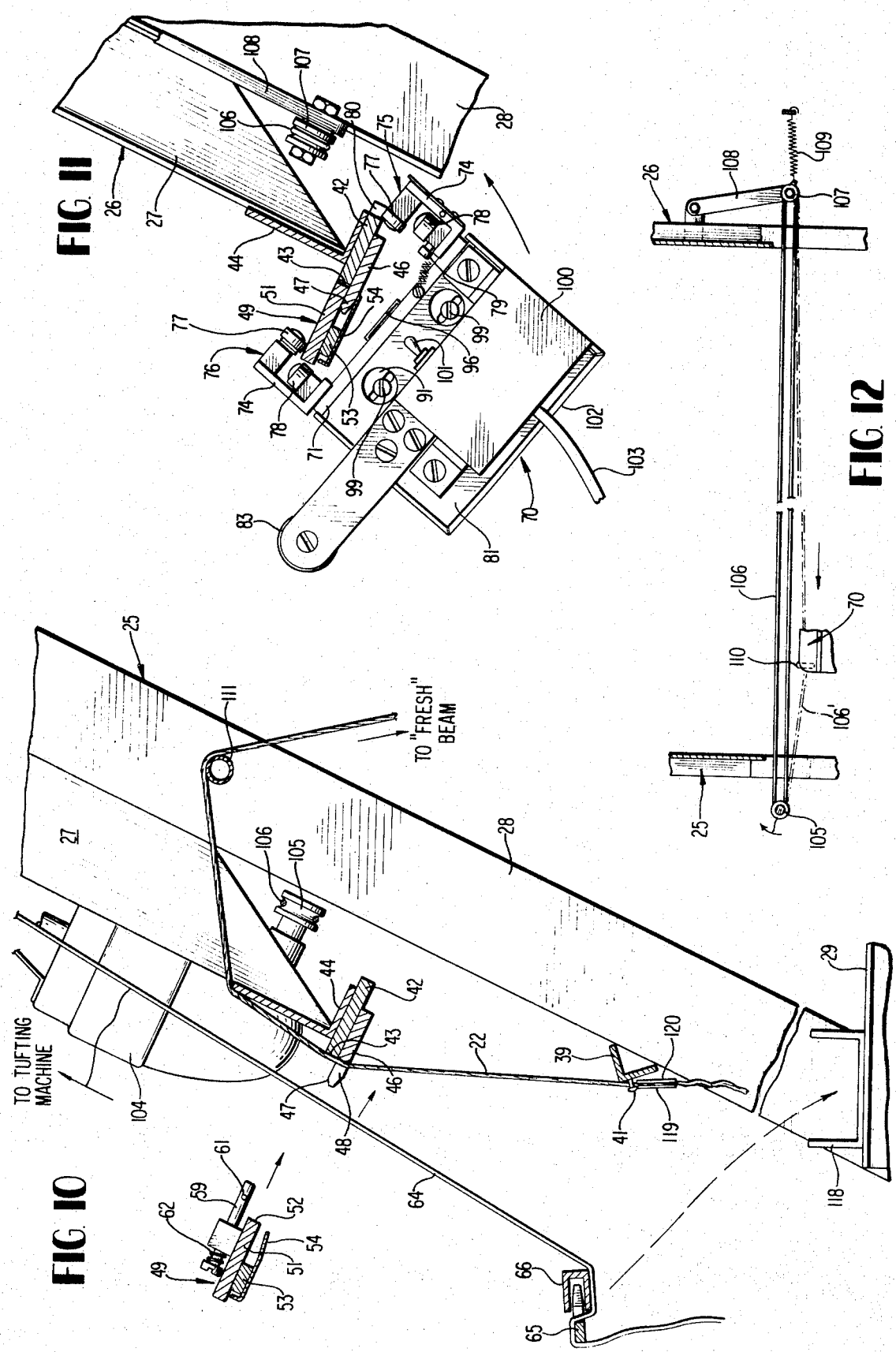

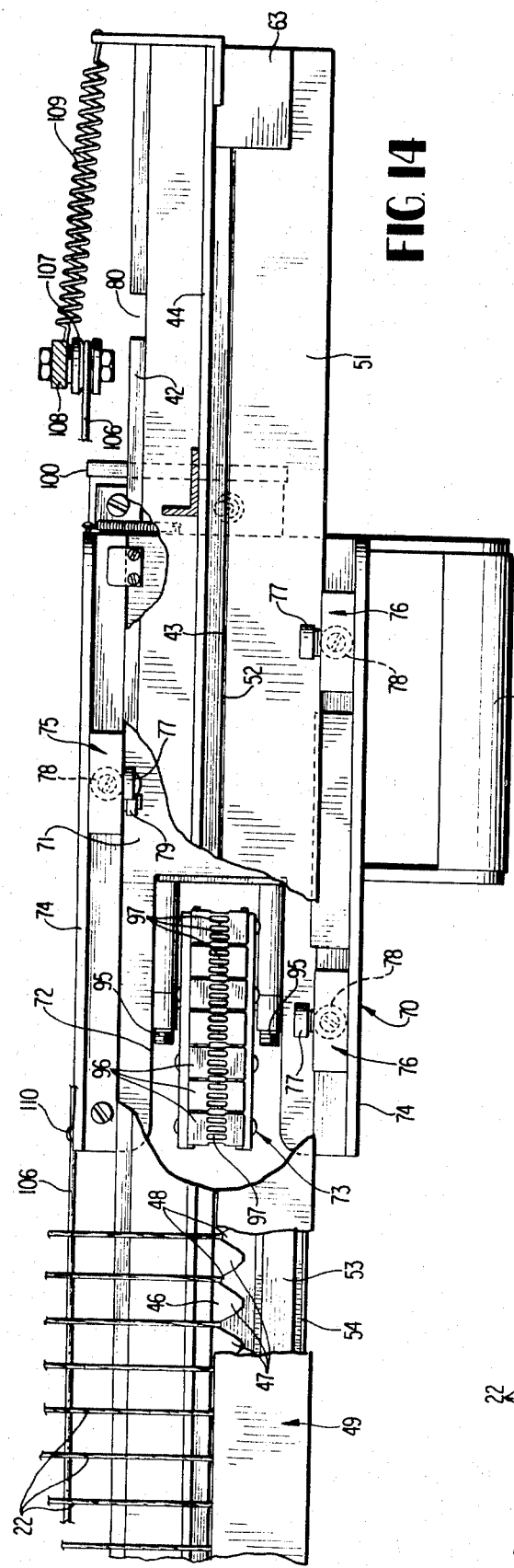
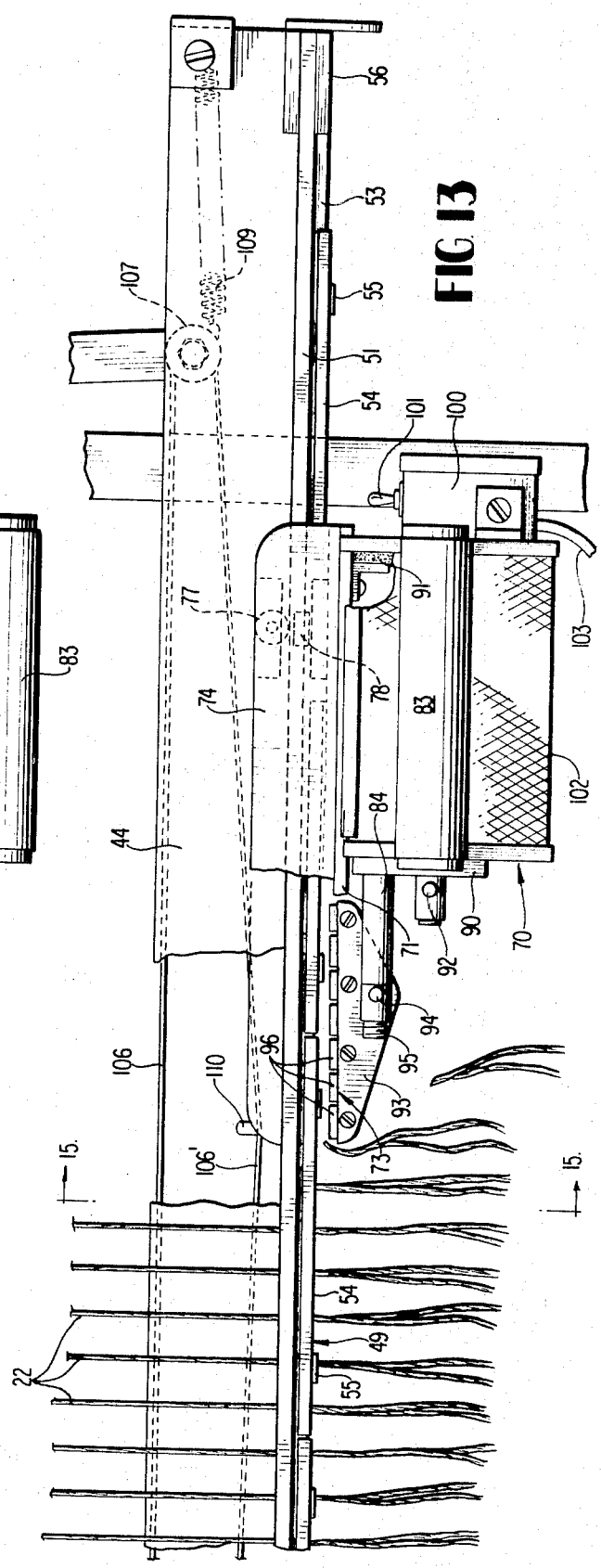
FIG. 14
FIG. 13

United States Patent Office 3,695,975
Patented Oct. 3, 1972

3,695,975
APPARATUS FOR RAPIDLY SPLICING A MULTI-
TUDE OF THERMOPLASTIC YARN ENDS
Willie Vincent Williams, P.O. Box 687,
Dalton, Ga. 30720
Continuation-in-part of application Ser. No. 773,773,
Nov. 6, 1968. This application Oct. 16, 1970,
Ser. No. 81,265
Int. Cl. B65l 69/06
U.S. Cl. 156—433      24 Claims

ABSTRACT OF THE DISCLOSURE

A support frame for the yarn splicing apparatus is portable and adapted to be suspended directly on the rack which supports the beams of yarn whose yarn ends are being fed into a carpet tufting machine. The apparatus frame may be attached to the beam rack at the location of a spent beam which is to be removed from the rack and replaced by a full beam. The splicing apparatus has means for aligning and securing the yarn ends trailing from the carpet with a like number of yarn ends on a full beam and a radiant heat splicing carriage is propelled across a guide track in close proximity to the ends to be fused or spliced.

CROSS-REFERENCE TO RELATED APPLICATION

This application is a continuation-in-part of prior copending application Ser. No. 773,773, filed Nov. 6, 1968, now Pat. No. 3,616,054, for Method of and Apparatus for Splicing Carpet Yarn Ends.

BACKGROUND OF THE INVENTION

As explained in the above-mentioned prior application, a drastic need has existed for some time in the carpet tufting industry for an efficient and rapid means for splicing thermoplastic yarn. In the tufting of modern carpet, up to thirty or more beams of yarn are being fed continuously to the tufting machine needles and each beam of standard length, such as five feet, may contain as many as one hundred and fifty individual yarn ends. The beams of yarn are customarily mounted on racks and arrangements of three, four or five beams per rack are utilized as discussed in said prior application. Inevitably, the beams become exhausted or spent after a period of usage and individual beams must be replaced rapidly on the racks by full beams and when this is done, the ends of yarn on the full beam must be carefully spliced with a corresponding number of yarn ends trailing from the carpet and which trailing ends have been severed from the exhausted or substantially exhausted beam, prior to its removal from the rack.

In the splicing of the yarn ends, knots or enlargements cannot be formed since these would not pass through the eyes of the tufting machine needles. It has been customary to splice all of the ends coming from a fresh beam with a corresponding number of ends trailing from the tufted carpet by a tedious and laborious hand splicing process which consists of applying latex cement to the individual ends being spliced. This is a disastrously slow process which causes excessive down time for the tufting machine whenever a beam splicing operation is required.

The method and apparatus disclosed in the mentioned prior application alleviates this problem with the provision of an efficient and rapid means to thermally splice the ends of yarn on a fresh beam with the trailing ends of a corresponding number of yarns in the carpet which have been separated or severed from a spent beam. In the method and apparatus, means are provided to align all of the yarn ends which are to be spliced and to hold them together in such a manner that a movable self-propelled heat splicing unit, while traversing a guide track, can rapidly and uniformly produce the desired splices which are exceedingly strong and cause no objectionable enlargements to interfere with the tufting machine needle eyes.

While the apparatus in the prior application is practical and successful in operation, it embodies a floor-mounted frame or support which is not entirely convenient to use and certain other components including the splicing carriage are somewhat bulky and complex and therefore excessively costly.

In view of the above, the principal object of the invention is to provide a greatly simplified and much more economical yarn splicing apparatus for splicing tufted carpet yarns generally in the manner disclosed in said prior application. The entire operating procedure has been simplified as well as the apparatus structure and the apparatus is lighter, very easy to set up for use and disassemble, when desired. More particularly, the radiant heat splicing carriage has been greatly simplified and rendered more compact and lightweight so that it can be easily picked up and carried about by hand and engaged and disengaged readily by hand from its guide track on the apparatus. Improved and simplified adjustments for the radiant heating element are built into the new carriage and a more efficient electrical heating circuit with a pair of transformers connected in parallel is provided. Also, the improved carriage has a unique gaging component which greatly facilitates the required accurate adjustment of the heating element prior to connecting the carriage with its guide track. Another significant improvement in the apparatus resides in the feature whereby the apparatus frame is connectable directly to the beam rack at a convenient elevation and through the use of quick release latches which enable the frame to be installed and removed with facility. The frame and the entire apparatus is much lighter than the apparatus in the earlier application. The propulsion means for the splicing carriage has been greatly simplified by the use of a small motor mounted separately on the apparatus frame and propelling the carriage by means of an endless flexible element which merely engages with a spring clip on the carriage and automatically disconnects therefrom when the carriage approaches the downstream end of the track. The relatively expensive drive gearing and long rack bar employed for propelling the splicing carriage or unit in the prior application have been entirely eliminated, resulting in a further important reduction in bulk, weight and cost.

Other important features and advantages of the new construction will be apparent during the course of the following description.

BRIEF DESCRIPTION OF DRAWING FIGURES

FIG. 1 is a perspective view of a yarn splicing apparatus embodying the invention mounted upon a beam rack near a tufting machine with the splicing carriage and other components of the apparatus removed and showing the apparatus in association with a substantially spent beam about to be replaced by a full beam.

FIG. 2 is a side elevational view of the apparatus generally as depicted in FIG. 1 but with the beam rack omitted.

FIG. 2A is a fragmentary elevational view of a lower frame latch in the active locking position.

FIG. 2B is a similar view of an upper frame latch.

FIG. 3 is a similar elevational view of the apparatus looking at the opposite end of the apparatus frame.

FIG. 4 is a front elevational view of the apparatus taken on line 4—4 of FIG. 2, with parts broken away.

FIG. 5 is a plan view of a detachable yarn gaging or clamping bar.

FIG. 6 is a bottom plan view of the same.

FIG. 7 is an enlarged transverse vertical section taken on line 7—7 of FIG. 6.

FIG. 8 is a composite elevational view of a two-part yarn clamp including a combing bar and channel.

FIG. 9 is an enlarged transverse vertical section through these elements in assembled relationship.

FIG. 10 is an enlarged fragmentary vertical cross sectional view through the apparatus showing the disposition of sets of yarn ends trailing from the tufting machine and extending from a fresh beam as they are about to be clamped and engaged in pairs prior to splicing.

FIG. 11 is a similar fragmentary cross sectional view illustrating primarily the engaging of the mobile yarn splicing unit to the guide track means of the apparatus.

FIG. 12 is an elevational view with parts in section taken substantially on line 12—12 of FIG. 3.

FIG. 13 is an enlarged fragmentary side elevational view of the apparatus with the splicing unit or carriage traveling along the track means and viewed normal to the longitudinal edge of the track.

FIG. 14 is a plan view of the apparatus as depicted in FIG. 13.

DETAILED DESCRIPTION

Figure 15:
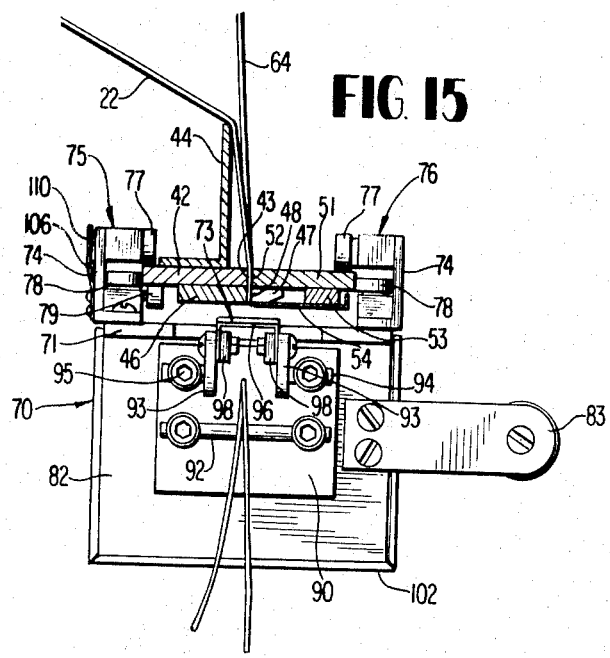
FIG. 15 is a transverse vertical section taken on line 15—15 of FIG. 13.

Referring to the drawings in detail, wherein like numerals designate like parts throughout, there is shown in FIG. 1 a fragmentary portion of a rack 20 for yarn beams, as it would be positioned near the yarn inlet end of a carpet tufting machine. For convenience of illustration, a single beam 21 only is shown mounted removably on the rack 20 in a substantially exhausted or diminished state. It will be understood by those skilled in the art that a number of beams, such as three or five, may be mounted on the same rack in a particular arrangement and that several racks of beams may be employed to feed a large number of yarn ends simultaneously to the needles of the tufting machine, not shown, which tufting machine may be capable of tufting carpet as wide as sixteen feet. For convenience, the thermoplastic yarn splicing apparatus embodying the invention will be explained in connection with the fragmentary and incomplete beam rack arrangement depicted in FIG. 1 and this showing is entirely sufficient for a proper explanation of the invention.

As indicated in FIG. 1, the individual yarn ends 22 wound on the nearly depleted beam 21 are normally fed upwardly and engage through openings in a guide bar or header 23 on the top of the rack 20. From this point, the web of yarn ends extends forwardly as at 22' and the yarn ends engage further conventional guide tube means, not shown which guide the yarn to the tufting needles, again, it being understood that a single beam only is being illustrated and that many such beams are simultaneously delivering yarn to the tufting machine. A typical beam 21 may be about five feet in axial length with about one hundred fifty individual yarn ends wound thereon.

The frame of the splicing apparatus indicated generally by the numeral 24 is designed in width to accommodate a typical or standard length beam, it being understood that in some special cases the apparatus frame may be longer or shorter. The frame 24 is preferably formed of structural aluminum for lightness and consists very simply of two generally L-shaped frame ends 25 and 26 each having an upwardly and rearwardly inclined, preferably two-part, frame bar consisting of members 27 and 28 which are suitably joined rigidly where they overlap. The frame ends 25 and 26 also include horizontal rearwardly extending brace bars 29 rigidly connected to the lower ends of the members 28 as by bolt means 30, FIGS. 2 and 3. Quick release latch means are provided on the tops of the members 27 and the rear ends of the bars 29 to secure the entire frame 24 detachably to the beam rack 20. This means comprises arm extensions 31 on the members 27 in the form of thin plates, these extensions having downwardly opening slots 32 adapted to engage over fixed suspension pins 33 projecting from the sides of the rack 20 at its top. In effect, the extensions 31 hook over these suspension pins. Pivoted keepers 34 on the extensions 31 have locking slots 35 which engage the pins 33 and lock the apparatus frame thereto safely when swung down to the position shown in FIG. 2B. In a similar manner, the rear ends of brace bars 29 are slotted at 36 to receive inwardly projecting pins 37 on the uprights of the rack 20 and pivoted keepers 38 on the bars 29 swing downwardly and engage over the pins 37, FIG. 2A, to complete the locking of the frame 24 to the rack 20 securely.

An angle bar 39 extends transversely across the front of the frame 24 and structurally ties together the two frame ends 25 and 26 by being bolted thereto at 40. The angle bar 39 is equipped on its forward side with a row of equidistantly spaced pins 41, the purpose of which will be described later.

Above the bar 39 and parallel thereto is an important component of the apparatus in the form of a rail 42 having a forward straight yarn clamping edge 43. The rail 42 is secured rigidly to the bottom of a sturdy angle bar 44 which also extends between the two frame ends 25 and 26 and is bolted to the arms or members 27 thereof at 45. Secured to the bottom of the rail 42 and substantially coextensive therewith is a toothed yarn spacing or gaging plate 46 having a multiplicity of closely spaced tapered teeth 47 defining between them tapered yarn gaging recesses or sockets 48, FIG. 14. Each socket is adapted to receive therein in side-by-side relation a single pair of yarn ends to be spiced. Sufficient teeth 47 and recesses or sockets 48 are provided to receive all of the yarn ends from a single beam and a corresponding number of trailing ends from the carpet to be spliced to the ends on a fresh beam.

A coacting yarn clamp bar assembly and rail section 49 completely separable from the rest of the apparatus, as shown, is provided. While not in use, FIG. 1, this assembly 49 may be stored in holder brackets 50 provided at the lower front of the frame 24. The clamp bar assembly 49 comprises a main body or plate 51 similar to the rail 42 and having a frontal straight yarn clamping edge 52. This assembly additionally comprises on its lower side a relatively narrow bar 53 anchored to the bottom surface of plate 51 rigidly. Secured adjustably to the bottom of the bar 53 is a sectional thin stainless steel gaging plate composed of a number of closely adjacent, individually adjustable plate sections 54, each being slotted near its ends and the slots receiving pairs of screws 55 which permit the individual adjustment of the sections prior to tightening. The gaging plate is formed in sections so as to be resistant to buckling or warping in the presence of heat from the radiant heating element, to be described.

The bar assembly 49 further comprises tongues 56 near its opposite ends adapted to enter beneath the rail 42 immediately beyond the ends of the gaging plate 46 when the assembly 49 is moved into yarn clamping engagement against the fixed rail 42, see FIG. 10. Additionally, smaller tongues 57 are secured to the opposite face of the plate 51 in spaced relation and these tongues enter guide slots 58 formed in the angle mounting bar 44 at intervals there along. In like manner, a series of quick release spring-loaded fasteners 59 on the assembly 49 enter key hole openings 60 in the bar 44 and releasably lock the assembly 49 in opposed relation to the rail 42 and associated elements on the apparatus frame. The fasteners 59 have screw driver slots, as shown, and include projecting locking pins 61. These fasteners require only a partial turn with the screw driver and a slight compression of their springs 62, FIG. 10, for locking and unlocking.

Stop plates 63 at the ends of the plate 51 and on the side thereof opposite the tongues 56 are adapted to directly abut the angle mounting bar 44 beyond the ends of the toothed bar 46 or plate for stabilizing the assembly 49 and for leaving a very slight gap between the clamping edges 43 and 52, as best shown in FIG. 11 and also in FIG. 14. Therefore, when the elements 63 are in actual contact with the upstanding web of bar 44, see the right hand end of FIG. 14, there will be a very slight gap between the opposing edges 43 and 52.

The apparatus further embodies an aid to manipulating and properly spacing the yarn ends 64 which trail from the tufted carpet after being severed from an exhausted beam 21. This aid or device similar to the assembly 49 is a separate assembly shown particularly in FIGS. 8 and 9 consisting of two parts, namely, a combing bar 65 and a channel-shaped clamping bar 66. The combing bar 65 has teeth 67 and intervening notches in sufficient numbers to engage all of the yarn ends of a beam, such as the beam 21. The spacing of the teeth and notches on the combing bar is the same as the spacing of the sockets 48 in the gaging plate 46 of the machine. Near its opposite ends, the combing bar 65 carries headed pins 68 engageable within end slots 69 in the clamping bar 66 so that the two members may be secured in interfitting or clamping relationship as shown in FIGS. 9 and 10. The use of this two-part assembly or device will be further amplified when the operation of the invention is summarized.

The machine further comprises a mobile heat fusing or splicing unit 70 which travels longitudinally on the guide rail of the machine made up of the assembly of the fixed rail 42 and the plate 51 which is part of the portable assembly 49. The complete guide rail assembly for supporting and guiding the unit 70 is shown in FIGS. 11 and 15 in cross section and is also depicted in FIGS. 13 and 14. The mobile unit 70 consists of a carriage plate 71 which has a relatively large rectangular opening 72 in its leading end to accommodate the heating or splicing element 73. A pair of side angle bars 74 are secured rigidly to the carriage plate 71 and project above the same and to these bars are secured guide roller assemblies 75 and 76, there being two of the assemblies 76 on one side of the carriage, FIG. 14, and one assembly 75 on the other side thereof between the assemblies 76. As shown best in FIG. 15, each of the assemblies 75 and 76 includes an upper guide roller 77 to roll on the tops of track elements 42 and 51 and also a right angular guide roller 78 to engage and roll along the edges of track elements 42 and 51. The single guide roller unit 75 also includes a third roller 79, as shown, which is adapted to engage the underside of track element 42 for stability. This third roller 79 may, if desired, be replaced by a flat shoe-type guide element for the same purpose. In any event, the splicing unit 70 is very accurately and stably guided along the track of the machine composed of the elements 42 and 51 after being engaged with the track. To permit this ready engagement, the track or rail 42 is provided near the upstream end thereof with a cut-out or notch 80, see FIGS. 11 and 14, of sufficient size to allow passage upwardly of the top guide roller 77 of the roller assembly 75 when the splicing unit 70 is applied manually to the machine track, as depicted by the showing in FIG. 11. After passing through the notch 70, the particular roller 77 is above the rail 42 and may roll on its top surface freely.

The splicing unit 70 further comprises on the bottom of the plate 71 frame members or plates 81 and 82 for the support of a carrying handle 83 at one side of the unit 70 and also for the support of the heating or splicing element assembly 73, previously mentioned. The heating element assembly shown particularly in FIG. 19 comprises a pair of generally parallel mounting arms 84 which serve to support a pair of transformers 85 whose primary coils 86 are electrically connected in parallel, whereby maximum current at minimum voltage may be delivered to the heating element. Each arm 84 has an integral reversely directed extension 87 parallel to the arm proper and this extension engages through the iron core 88 of the transformer in supportive relation thereto and electrically insulated by an insulating plate 89 from the multiple turns of the adjacent primary coil 86. The arms 84–87 also function as a single turn secondary for each parallel connected transformer 85 and these arms or secondaries are isolated electrically from the carriage frame by being directly supported on insulating blocks 90 and 91, FIG. 13. The two arms serving as secondaries are electrically connected in series by a conducting rod 92 so that the arms may deliver current at low voltage through the heating element frames 93 with which they are directly connected through lateral pin extensions 94 on these frames. The elements 93 and 94 are preferably formed of brass or the like. The pin extensions 94 also serve to pivotally mount the frame sides 93 to the forward ends of arms 84 so that the heating element may be pivotally adjusted on the common cross axis through the pins 94 and then locked by set screws 95.

Figure 19:
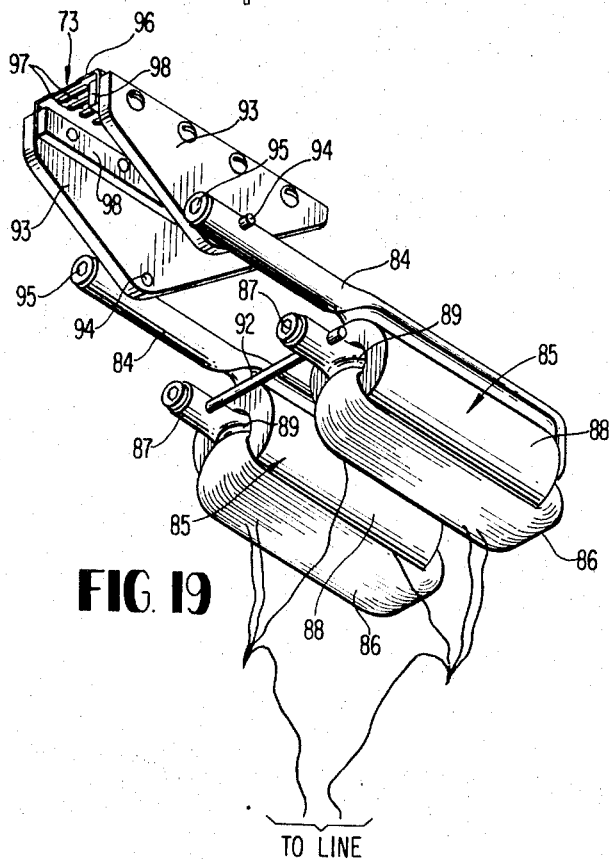
FIG. 19 is a perspective view of the heating element assembly and its transformers.

The heating element proper consists of a group, preferably seven, of relatively thin Nichrome U-shaped elements 96, each one of which is slotted transversely to form a plurality of narrow heating strips 97 intervened by slots. These narrow strips 97 actually constitute the rather critical radiant heating components which collectively act to fuse or splice the thermoplastic yarn ends. As best shown in FIGS. 15 and 19, the sides of the Nichrome elements 96 are secured to the frame sides 93 individually by clamping bars 98 secured with screws to the frame sides 93. Collectively, the elements 96 form a flat radiant heating strip or element of about three and one-half inches in length.

In addition to being bodily adjustable pivotally on the axis of pins 94, the entire element including the arms 84 can be adjusted somewhat laterally with respect to the carriage plate 71 and can be slightly raised and lowered. The rear insulating plate 91 is slotted transversely for this purpose and adjusting screws are indicated at 99 in FIG. 11. Therefore, the heating element proper composed of the segments 96 can be very accurately adjusted relative to the bottoms of elements 46 and 54 so that precisely the right heat is radiated onto the yarn ends 22 and 64 being spliced. The actual size of the splice produced is adjusted by lateral adjustment of the segmental plate sections 54 relative to the toothed gaging plate 46, FIG. 15.

The unit 70 has a housing 100 on its rear end for a heating element on and off switch 101 and a removable ventilated cover 102 of expanded metal or the like engages over the two transformers and encloses the same. A suitable cable 103 extends from the switch box 100 to any convenient source of 110 volts AC and this cable is of sufficient length to enable the unit 70 to traverse the full length of the machine guide track including element 42 in FIG. 1.

A very simplified means is provided on the machine to propel the splicing unit 70 at a prescribed speed along the track transversely of the yarn ends being spliced. This means is in the form of a small conventional motor-speed reducer unit 104 suitably bracketed to the machine end frame 25 and having an output pulley 105 disposed beyond one end of and slightly above the machine guide tracks, see FIG. 2 and FIG. 4. This pulley engages and drives an endless flexible nylon cable 106 which is substantially coextensive with the guide track and is held taut near the opposite end of the track by a sheave 107 on a vertically swingable arm 108 attached to the frame end 26. This sheave and arm are biased by a spring 109 in a direction to tension the cable 106. As shown, the lower run of the cable 106 designated 106' in FIG. 13 engages a spring clip 110 on one side member 74 of the carriage frictionally. When the unit 70 is applied to the track near the upstream end, FIG. 11, the lower cable run 106' is merely clipped to the carriage manually and the engagement is sufficient to propel or pull the carriage along the guide track to a point near its downstream end where all of the yarn ends of a fresh beam are fully spliced with trailing ends severed from an exhausted beam. At this point, or slightly beyond, the cable run 106', FIG. 12, where it rises to go around the pulley 105 will disengage itself automatically from the clip 110 of the unit 70 and the unit will stop without danger of running off the end of the track. The attendant then simply pulls the entire unit 70 from the downstream end of the track and may set it aside until ready for the next splicing pass where the unit is again engaged with the track by utilizing the notch 80 near the upstream end, as depicted in FIG. 11.

For a purpose to be described, the machine further comprises a preferably cylindrical guide rod 111 over which yarn ends may pass, FIG. 10, and one end of this guide rod is engaged by a yielding leaf spring 112, FIG. 2, enabling quick removal of the rod from the machine frame when desired by forcing it against the spring 111 so as to disconnect the opposite end of the rod from the frame.

Figure 16:
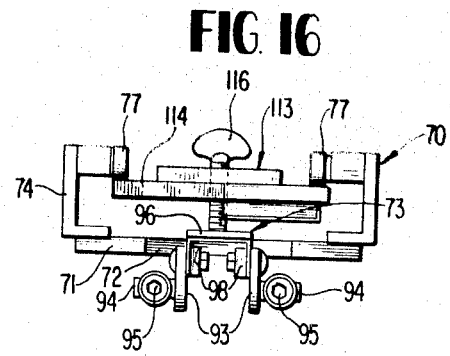
FIG. 16 is an end elevational view of a heating element gaging or adjusting unit in place on the carriage, parts omitted.
Figure 17:
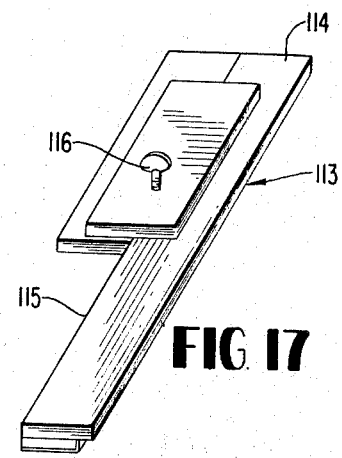
FIG. 17 is a perspective view of the gaging unit per se.
Figure 18:
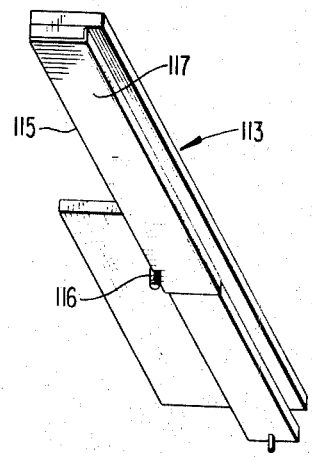
FIG. 18 is another perspective view of this unit showing the underside thereof.

Finally, the machine comprises a convenient means to preadjust the heating element 73 prior to mounting the unit 70 on the machine track where certain parts are obscured from view because of being under the track. This adjusting means, shown particularly in FIGS. 16 through 18, embodies a gage 113 in the form of a simulated guide track section 114 having a large portion cut away at 115 to permit a full view of approximately one-half of the heating element 73. The simulated track section 114 is engageable with the guide rollers 77 and 78 in the same manner that the actual track composed of elements 42 and 51 engages these rollers. A set screw 116 is provided on the gage unit 113 to lock the gage in place on the carriage of the splicing unit 70, FIG. 16, by simply turning the set screw into engagement with the carriage plate 71. The bottom of the gage carries a thin plate section 117 accurately simulating one of the segmental plate sections 54 of the portable unit 49. With the gage applied to the unit 70 in this manner, prior to mounting the splicing unit on the machine, the operator can accurately make the adjustments on the heating unit 73 while it is fully exposed to view in the cut-away portion 115. After these adjustments are completed, the gage 113 is simply removed and set aside.

The machine possesses another convenient feature in the form of a pair of short channel supporting members 118 at the lower forward corners of the frame, FIG. 1, for the purpose of temporarily supporting the elements 56 and 66 and/or the rod 111 or other similar components during periods of non-use.

OPERATION

Referring again to FIG. 1, this figure shows a substantially empty beam 21 whose ends 22 have been feeding into a tufting machine at 22' after engaging the apertured header 23. It is now necessary to sever the ends 22 from the spent beam and to remove the spent beam from the rack 20 and replace it by a new full beam whose fresh yarn ends must be spliced with the severed trailing ends leading into the tufting machine. Different techniques can be employed at this point. For example, the yarn ends 22 may be engaged and clamped by one of the assemblies consisting of the comb bar 65 and coacting channel 66. If so, the ends 22 are severed below the point of clamping and the clamped trailing ends can be lifted aside or temporarily counterweighted in the manner disclosed in said prior application.

According to a different procedure, the yarn ends may simply be severed without clamping at a convenient point above the empty beam and then bunched up into two loose groups which are temporarily hung over the tops of the rack 20 on opposite sides, preferably on hooks provided for this purpose. In this way, the loose trailing ends from the tufting machine are out of the way in an overhead position but are of course still engaged through the header 23 to maintain their spacing.

With this done, and the fresh beam in place on the rack 20, the splicing procedure is ready to begin. For the purpose of this description, it is assumed that the yarn ends on the fresh beam are previously taped together on opposite sides as by adhesive tapes 119 and 120 in FIG. 10. If pre-taping is required, this is accomplished by the use of a special taping bar, not shown herein, and forming a separate device or implement. In any event, it will be understood that the purpose of the tape on the yarn ends of the fresh beam is to maintain the gage or spacing of the ends to correspond with the spacing of the tufting machine needle eyes and the guide openings in header 23.

As indicated most clearly in FIG. 10, the leading ends from the fresh beam with their tapes are pulled upwardly and over the rod 111 and then the ends 22 are laid carefully into the gaging spaces 48 between the teeth 47 of gaging bar 46. It will be noted that the ends now extend transversely across the edge 43 of rail section 42. The tapes 119 and 120, FIG. 10, are now engaged below the small pins 41 for temporary anchorage. In some cases, the front face of the anchoring bar 39 may be equipped with material or teeth similar to the teeth found on cotton carding drums or hook-like material of the Velcro type to engage and hold the yarn ends 22 temporarily. This is an optional refinement.

With the ends 22 from the fresh beam thus in place, the overhead loosely bundled trailing ends, not shown, are released to free hanging positions and the comb bar 65, handled at opposite ends preferably by two attendants, engages the yarn ends close to and below the header 23 so that the ends are gaged between the teeth 67. The comb is drawn downwardly and may be rotated or twisted on its axis to hold the ends numbered 64 in FIG. 10. These ends are brought in front of the gaging bar 46, as shown. The clamping channel 66 may be assembled with the comb 65 and this unit may simply hang while attached to the ends 64 and the latter are shifted into the gaging spaces 48 between the teeth 47. Therefore, at this time, a pair of ends consisting of one end 22 from the fresh beam and one trailing end 64 is now engaged side-by-side in each of the gaging spaces 48, see FIGS. 14 and 15. With all of the yarn ends so arranged, the assembly 94 is brought into place in the manner shown in FIG. 10 and fully described previously and locked by means of the several fasteners 59. The edges 52 and 43 are now very closely disposed, FIG. 15, substantially in gripping relation with the pairs of yarn ends and the pre-adjustment of the plates 54 close to the roots of the teeth 47 will determine the actual limits of each splice when the heating element passes over the track.

With the unit 49 in place and clamping all of the yarn ends 64 and 22 in properly gaged pairs, the motor unit 104 for cable unit 106 is started from a convenience outlet 121, FIG. 1, on the machine frame 24. The splicing unit 70 is brought into engagement with the track, FIG. 11, as fully described, and the lower run 106 of the cable is engaged with the carriage clip 110 and the heating element 73 is energized at the switch 101. The carriage now is propelled at a predetermined speed along the machine track, FIG. 13, and the elements 96 whose strips 97 are heated to a cherry red successive sever the portions of the yarn beneath the track structure and radiate heat to the held yarn ends between the edges 42 and 53 as regulated by the placement of the adjustable plates 54. The speed of movement of the unit 70, the length of the element 73 and its precise adjustment relative to the yarn ends causes thermal splicing of each pair of ends in a uniform and secure manner without knots or enlargements as explained. The heating element 73 as shown in FIG. 13 is preferably tilted slightly on the pivot pins 94 so that its trailing end is slightly closer to the track and yarn ends than its leading end. This gradually increases the radiant heat from front-to-rear of the heating element as the carriage moves along the track.

At the end of the traverse, the propelling cable will automatically disengage the clip 110 and the unit 70 is turned off at the switch 101 and removed from the machine. The clamping and guide rail assembly 49 is removed and the ends 22 from the fresh beam are spliced securely to the trailing ends 64 leading to the tufting machine and the tufting operation may commence as before. The assembly 49, when removed, is placed in the holders 50 and the entire apparatus will appear as it does in FIG. 1 except that the beam 21 will now be a full beam and not an empty one. The frame 24 may now be lifted to the next location where a beam is empty and another splicing operation is required and the procedure is repeated. The entire operation can be carried out quite quickly after a short time of acquaintance with the machine and its usage by a relatively unskilled operator.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A machine for splicing thermoplastic yarn ends employed for carpet tufting comprising a supporting frame releasably attached to a carpet yarn beam supporting rack adjacent to a beam thereon, a toothed yarn gaging bar and track section fixed to said frame and extending thereacross transversely of yarn ends from said beam, a coacting yarn clamping bar and track section releasably attached to said gaging bar and track section so as to form with the latter a trackway across the machine for a mobile splicing unit and also serving to clamp pairs of yarn ends in spaces between the teeth of the gaging bar, a moving conveyor element on the machine near the trackway extending lengthwise thereof, and a yarn splicing unit including a heating element engaged movably with the trackway and having means releasably attached to the conveyor element and automatically separable therefrom near the downstream end of the trackway, the heating element traveling along the trackway in close proximity to the yarn ends clamped by said gaging bar and said clamping bar.

2. The structure of claim 1, and said supporting frame having suspension latches through which said frame is removably suspended bodily from the beam rack.

3. The structure of claim 1, and said toothed yarn gaging bar and track section including a stationary rail member having a longitudinal yarn clamping edge and a yarn gaging bar secured to the bottom of the rail member with spaced teeth projecting immediately forwardly of said yarn clamping edge.

4. The structure of claim 3, and said rail member provided near its upstream end with a notch allowing the entry of a roller on said splicing unit therethrough.

5. The structure of claim 3, and said coacting yarn clamping bar and track section including a rail member having a yarn clamping longitudinal edge substantially abutting the clamping edge of the first-named rail member, and an adjustable gaging plate means on said coacting bar and track section overlapping the teeth of the yarn gaging bar, and quick release fasteners on said clamping bar and track section engaged with opening means of the machine frame.

6. The structure of claim 1, and said conveyor element comprising an endless flexible conveyor element, a motor means on said supporting frame operatively connected with the endless flexible conveyor element to drive the same, and a separate resiliently biased pulley means on the supporting frame engaging the conveyor element and maintaining it taut.

7. The structure of claim 6, and said means releasably attached to the conveyor element and automatically separable therefrom being a clip on the yarn splicing unit.

8. The structure of claim 1, and said yarn splicing unit comprising a portable unit removably engaged with said trackway near one end of the trackway and separable bodily from the other end of the trackway after said automatic separation from the conveyor element.

9. The structure of claim 8, and a carrying handle on said portable yarn splicing unit.

10. The structure of claim 1, and said yarn splicing unit having guide roller means thereon simultaneously engaging the top and the longitudinal edges of the trackway, the trackway having clearance passage means for one roller of the unit to permit engagement of the unit with the trackway.

11. A machine for splicing multiple pairs of thermoplastic yarn ends comprising supporting means including a relatively stationary track section which extends transversely of the pairs of yarn ends, a coacting track section movable into engagement with the stationary track section and detachably secured thereto, the two track sections receiving the pairs of yarn ends between them clampingly and maintaining adjacent pairs spaced apart, a heat splicing unit movably engaging the two track sections while the latter are connected and including a heat splicing element which travels close to one side of the trackway formed by the two track sections, and means to propel the heat splicing unit on the two track sections longitudinally so that the heat splicing element may splice each of said pairs of held thermoplastic yarn ends in succession.

12. The structure of claim 11, and said means to propel the heat splicing unit comprising a conveyor means on the supporting means adjacent said stationary track section and releasably engaged with the heat splicing unit to move the same in one direction on said two track sections.

13. The structure of claim 12, and said conveyor means including an endless flexible conveyor element extending lengthwise of said stationary track section.

14. The structure of claim 11, and said relatively stationary track section having a multiplicity of teeth formed along the length of the same and the space between each adjacent pair of teeth receiving one pair of yarn ends in side-by-side substantially contacting relation, said two track sections having opposing longitudinal edges which clamp the pairs of yarn ends close to the roots of the teeth.

15. The structure of claim 11, and the heat splicing unit comprising a carriage having opposite side roller means engaging the top surfaces and side longitudinal edges of said two track sections.

16. The structure of claim 15, and a pair of parallel connected step down transformers on the carriage including primary windings and series connected single turn secondaries which also serve as the supporting means for the transformers on said carriage, and an electrical heating element pivotally connected with said single turn secondaries and adapted to be locked in selected angularly adjustable positions.

17. The structure of claim 16, and a gage releasably secured with said carriage of the heat splicing unit and having a cut-away portion adjacent said heating element, said gage simulating the trackway formed by said two track sections and thereby facilitating pre-adjustment of the heating element before the heat splicing unit is placed upon the trackway formed by said two track sections.

18. The structure of claim 11, and a separately formed portable toothed comb bar engaged with ends of yarn after serving the same from an empty beam to bring the severed ends into parallelism and proper spaced relation to engage the relatively stationary track section prior to attaching said coacting separable track section thereto, said stationary track section having yarn spacing teeth which have substantially the same spacing as the teeth of said comb bar.

19. The structure of claim 11, and said heat splicing unit comprising a carriage for guided movement along the trackway and having guide roller means engaging the top faces of said two track sections and suspending the carriage therefrom, said heat splicing element being mounted on the carriage below said trackway in closed spaced relation to the bottom faces of said two track sections and the yarn ends clamped therebetween.

20. The structure of claim 19, and means to adjust said heat splicing element angularly with respect to the length of the trackway and bodily toward and away from the trackway and to lock the element in the selected adjusted position.

21. A machine for splicing multiple pairs of thermoplastic yarn ends with said pairs disposed substantially in a common plane side-by-side and spaced apart, said machine comprising a supporting frame releasably attached to a beam supporting rack at a desired elevation thereon, a first track section and yarn end clamping and spacing member secured to the supporting frame transversely of the yarn ends, a coacting bodily separate second track section and yarn end clamping member releasably attached to said first member in abutting relationship to form a single trackway and with the yarn ends spaced and clamped near the center of the trackway, a portable carriage engaging the trackway near one end thereof and adapted to travel lengthwise on the trackway to the opposite end of the trackway and removable bodily from such opposite end, a conveyor means on the supporting frame near the trackway and releasably engaged with the carriage to propel the carriage along the trackway, the conveyor means including power driving means separate from the carriage, a heat splicing element on the carriage and moving with the carriage close to the bottom of the trackway and adjacent to the spaced and clamped yarn ends held between the first and second track sections.

22. The structure of claim 21, a yarn guiding bar on the supporting frame above the first track section guiding yarn ends from a new beam, said guiding bar substantially parallel to said first track section, and an anchoring bar for yarn ends on said supporting frame below said first track section and having projection means engaging the yarn ends from the new beam.

23. The structure of claim 22, and a portable combing and clamping unit for trailing severed yarn ends engaging the latter and arranging them for proper engagement with said yarn end spacing and clamping member.

24. The structure of claim 21, and interlocking positioning means on the first and second track sections releasably securing them in proper clamping and yarn spacing engagement and connecting them rigidly while forming said single trackway.

References Cited
UNITED STATES PATENTS

| | | | |
|---|---|---|---|
| 3,055,786 | 9/1962 | Hendrix | 156—502 X |
| 3,160,547 | 12/1964 | Williams | 156—502 X |
| 3,323,971 | 6/1967 | Williams | 156—502 X |
| 3,492,181 | 1/1970 | Riseley | 156—502 X |

PHILIP DIER, Primary Examiner

U.S. Cl. X.R.

156—502, 158